(12) United States Patent
Araiza

(10) Patent No.: US 7,770,249 B2
(45) Date of Patent: Aug. 10, 2010

(54) WIRING HARNESS TOOLING DEVICE

(75) Inventor: Carlos Rafael Rodriguez Araiza, Antioch, TN (US)

(73) Assignee: K & S Wiring Systems Inc., Levergne, TN (US)

(*) Notice: Subject to any disclaimer, the term of this patent is extended or adjusted under 35 U.S.C. 154(b) by 0 days.

(21) Appl. No.: 11/907,530

(22) Filed: Oct. 12, 2007

(65) Prior Publication Data
US 2009/0094756 A1 Apr. 16, 2009

(51) Int. Cl.
*B25F 1/04* (2006.01)
*B26B 11/00* (2006.01)

(52) U.S. Cl. .................... 7/107; 7/118; 7/168

(58) Field of Classification Search .............. 7/107, 7/108, 167, 168, 165, 118; 81/177.4, 440
See application file for complete search history.

(56) References Cited

U.S. PATENT DOCUMENTS

| | | | |
|---|---|---|---|
| 4,434,542 A * | 3/1984 | Forberg et al. | 7/107 |
| 4,852,925 A * | 8/1989 | Lodin | 7/107 |
| 5,839,921 A | 11/1998 | Yamanashi | |
| 6,014,787 A | 1/2000 | Rivera | |
| D427,875 S | 7/2000 | Chiu | |
| 6,085,374 A | 7/2000 | Richey | |
| 6,220,127 B1 | 4/2001 | Berg et al. | |
| RE37,210 E | 6/2001 | Chuang | |
| 6,286,168 B1 | 9/2001 | Woodruff et al. | |
| 6,601,481 B2 * | 8/2003 | Chuang | 81/440 |
| D479,788 S | 9/2003 | Ocklenburg | |
| 6,622,329 B2 | 9/2003 | Ostor et al. | |
| D494,438 S | 8/2004 | Falkenstein et al. | |
| 7,020,923 B1 * | 4/2006 | Jangula | 7/166 |
| 7,140,280 B2 | 11/2006 | Hawkins et al. | |
| D544,329 S | 6/2007 | Tansbo et al | |
| 7,281,456 B2 * | 10/2007 | Chiang | 81/440 |
| 7,284,557 B1 * | 10/2007 | Williams | 7/168 |
| D555,455 S | 11/2007 | Cheng | |
| 2002/0073490 A1 | 6/2002 | Wu | |

* cited by examiner

*Primary Examiner*—Hadi Shakeri
(74) *Attorney, Agent, or Firm*—Pillsbury Winthrop Shaw Pittman LLP

(57) ABSTRACT

A tooling device configured to manipulate an electrical connector is disclosed. The tooling device has a body and a first pair of prongs pivotally mounted to the body. Each of the prongs of the first pair of prongs is spaced apart. The prongs pivot independent of each other and have an identical configuration.

18 Claims, 8 Drawing Sheets

WIRING HARNESS TOOLING DEVICE

FIELD OF THE INVENTION

The present invention relates to the field of mechanical tooling implements, and more in particular to a tooling device for manipulating wiring connectors and wiring harnesses.

BACKGROUND OF THE INVENTION

Electrical devices and electrical systems utilize wiring harnesses, also known as connectors, to couple wires to the device or system. Wiring harnesses typically include a rigid body, internal wirings, and conductive retainers for coupling external wires to the wiring harness. These conductive retainers are typically made of metal strips that hold conductive portions of external wirings in compression against another surface.

To connect these external wirings to a wiring harness, the insulating sleeve covering the external wire is removed from an end of the external wire. This end of the wire is then inserted into the wiring harness where it engages the conductive retainer. The conductive retainer holds the external wire in compression against another surface of the wiring harness. The conductive retainer is coupled to internal wirings in the wiring harness, which are in turn connected to the electrical device or electrical system. In this manner, the wiring harness connects external wirings to the device or system.

SUMMARY OF THE INVENTION

In a first embodiment, a tooling device configured to manipulate an electrical connector is disclosed. The tooling device has a body and a first pair of prongs pivotally mounted to the body. Each of the prongs of the first pair of prongs is spaced apart. The prongs pivot independent of each other and have an identical configuration.

In a second embodiment, a tooling device for manipulating a wiring harness is disclosed. The tooling device has a pair of identically shaped tools pivotally attached to each other. The tooling device also includes a spacer separating the pair of identically shaped tools. The spacer is connected to a housing.

In a third embodiment, a tooling device for a wiring harness is disclosed having a housing. A first tool is pivotally mounted on a first axis to the housing. The first tool has an end for engaging the wiring harness. A second tool is pivotally mounted on the first axis to the housing. The second tool has an end for engaging the wiring harness. The first and second tools having an identical length. The ends of the first and second tools have an identical shape. A spacer is positioned between the first and second tools. The first and second tools pivot independently of each other. The first and second tools can be pivoted into a operative position independently of each other. The first and second tools can be pivoted into the operative position together.

The tooling device may include a third tool pivotally mounted on the first axis to the housing. The third tool has an end for engaging the wiring harness. The tooling device may also include a fourth tool pivotally mounted on the first axis to the housing. The fourth tool has an end for engaging the wiring harness. The third and fourth tools have an identical length. The ends of the third and fourth tools have an identical shape. The tooling device may also include a second spacer positioned between the third and fourth tools. The third and fourth tools pivot independently of each other and can be pivoted into an operative position independently of each other. The third and fourth tools can also be pivoted into the operative position together.

The tooling device may also include a flat tool having a flat body and a pair of planar prongs. The planar prongs extend from an end of the flat tool and are positioned parallel to each other. The ends of the first and second tools may be beveled. In addition, the ends of the first and second tools may be angled. The tooling device may also include a fifth tool pivotally mounted to the housing having a circular rod extending parallel to the first axis.

Other objects, features and aspects of the invention will become apparent from the following detailed description, the accompanying drawings, and the appended claims.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

Figure 1:
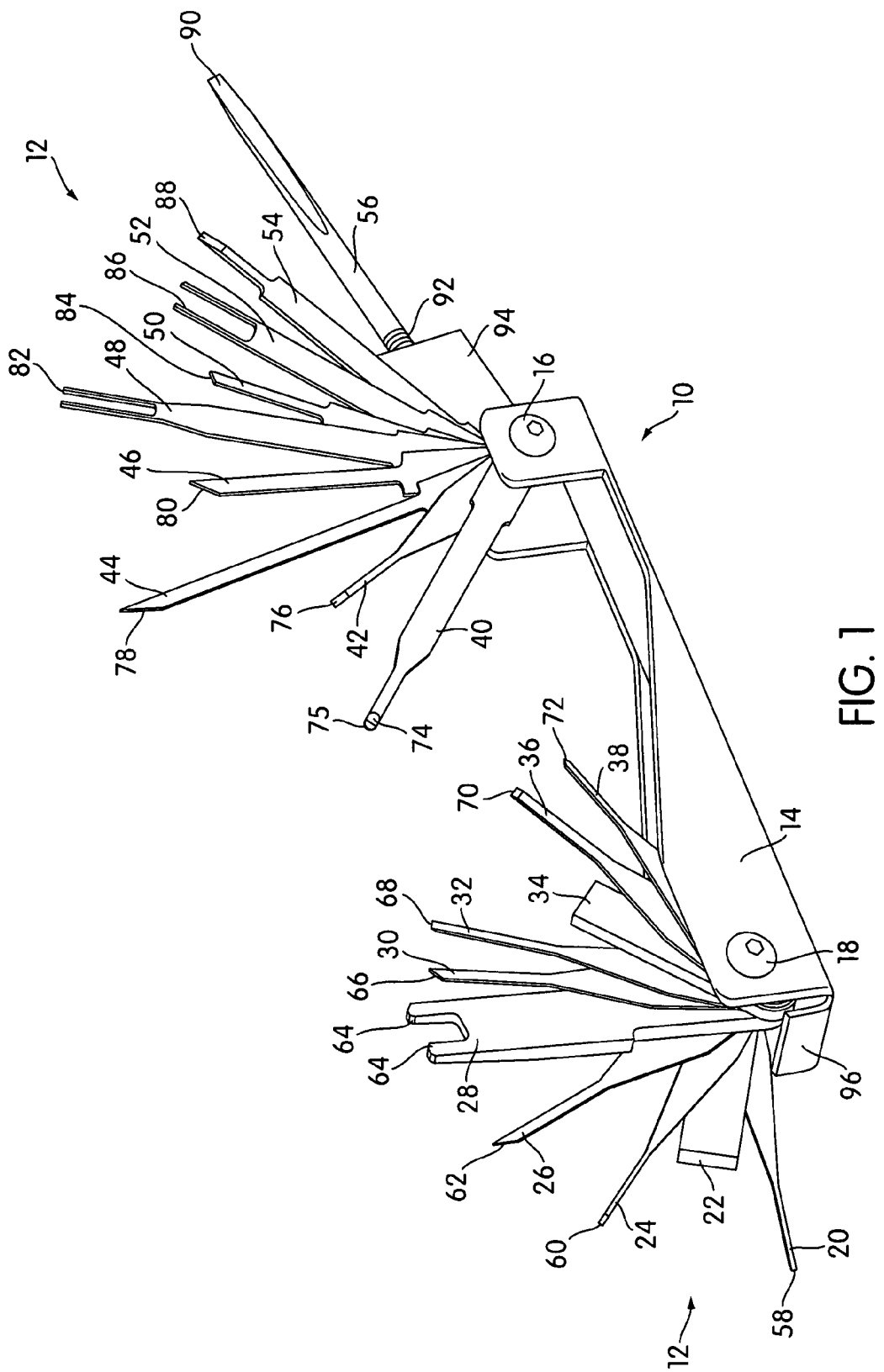
FIG. 1 illustrates a perspective view of a tooling device having a plurality of tools pivoted at various angles for illustration.

While the invention has been shown and described with reference to a particular embodiment thereof, it will be understood to those skilled in the art, that various changes in form and details may be made therein without departing from the spirit and scope of the invention. FIG. 1 illustrates a perspective view of a tooling device 10 having a plurality of tools 12 pivoted at various angles for illustration. Tooling device 10 includes a housing 14. Housing 14 includes rods 16 and 18. Rods 16 and 18 are mounted to each end of housing 14. Rods 16 and 18 are positioned parallel to each other. Tools 12 are pivotally mounted to rods 16 and 18. Tools 12 may be pivoted from a stored position shown in FIGS. 6 and 7 to an operative position shown in FIGS. 8 and 9.

Tooling device 10 includes a tool 20, a spacer 22, and a tool 24. Tools 20 and 24 have identical shapes. Tools 20 and 24 may pivot separately from the stored position to the operative position. Tools 20 and 24 may also be pivoted from the stored position to the operative position together. Tools 20 and 24 are separated by spacer 22. Tools 20 and 24 are pivotally mounted to rod 18. Spacer 22 is pivotally mounted to housing 14.

Tooling device 10 also includes tools 26, 28, 30, and 32. Tooling device 10 further includes spacer 34 and tools 36 and 38. Tools 32 and 36 have identical shapes. Tools 32 and 36 are separated by spacer 34. Tools 26, 28, 30, 32, 36 and 38 are pivotally mounted to rod 18. Tools 20, 24, 26, 28, 30, 32, 36 and 38 and spacers 22 and 34 may each be pivoted separately from the stored position to the operative position. Tools 32 and 36 may be pivoted from the stored position to the operative position together so that they may be used together. Spacers 22 and 34 may also be pivoted about rod 18. Tools 20, 24, 26, 28, 30, 32, 36 and 38 may be formed from a durable material such as steel.

Rod 16 pivotally supports tools 40, 42, 44, 46, 48, 50, 52, 54, and 56. Tools 40, 42, 44, 46, 48, 50, 52, 54, and 56 may be pivoted from the stored position to the operative position independently of each other.

Figure 9:
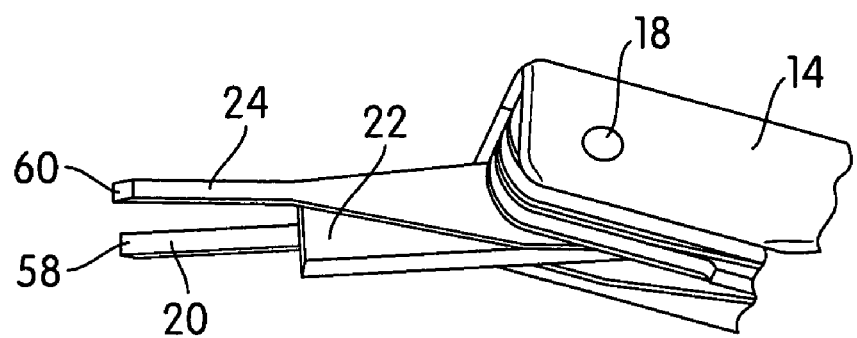
FIG. 9 illustrates a perspective view of the tooling device having a pair of tools extended into an operative position where the pair of tools are separated by a spacer.

Tool 20 has a beveled end 58. Tool 24 has a beveled end 60 that is identical to beveled end 58. As shown in FIG. 9, in one embodiment, tool 20 and tool 24 may be positioned relative to each other such that the beveled ends 58 and 60 of tools 20 and 24, respectively, are facing in opposing directions. As such, tool 20 and tool 24 may be considered "mirror images" of each other, or in an inverted position relative to each other. Tool 26 has an angled end 62. Tool 28 has a pair of protrusions 64 extending there from. Tool 30 has an angled end 66. Tools 26 and 30 have identical shapes. Tools 26 and 30 may be pivoted separately or together from the stored position to the operative position. Tool 32 has a beveled end 68. Tool 36 has a beveled end 70. Tool 38 has a pointed end 72.

Tool 40 has a rod 74 mounted at the end. Rod 74 has a protrusion 75 extending there from in an axial direction. Rod 74 and protrusion 75 form a hook. Tool 42 has a beveled end 76. Tool 44 has an angled end 78. Tool 46 has an angled end 80. Tool 48 has a pair of thin prongs 82 extending there from. Tool 50 has an angled end 84. Tool 52 has a pair of thin prongs 86 extending there from. Tool 54 has a beveled end 88. Tool 56 has a long beveled end 90. Tool 56 has a threaded base that is mounted to pivot base 94. Housing 14 is provided with curved ends 96 and 98 (shown in FIG. 2).

Figure 2:
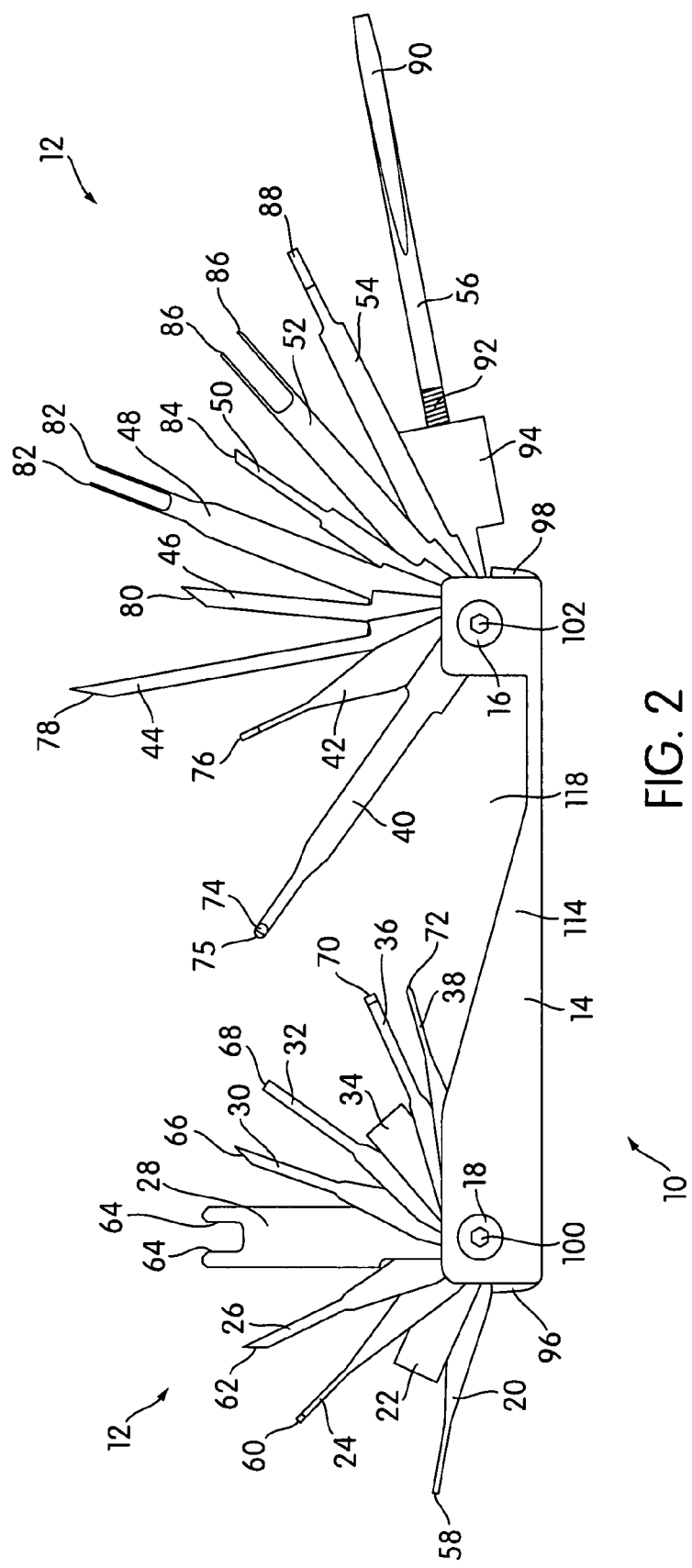
FIG. 2 illustrates a side view of the tooling device.

FIG. 2 illustrates a side view of the tooling device 10. The plurality of tools 12 are arranged at various angles for illustration. Rods 16 and 18 have hexagonal recesses 100 and 102. In one exemplary embodiment, rods 16 and 18 are hexagonal bolts that can be attached or removed from housing 10 through the use of an allen wrench. The use of hexagonal bolts allows for the removal of tools 12 for repair or replacement.

Tools 12 are configured to manipulate a wiring harness 104 or 108 (shown in FIGS. 10-14), also known as a wiring connector. Wiring harnesses 104 and 108 are configured to connect an external wire 110 to an electrical device (not shown). Wiring harnesses, such as 104 and 108, exist in many different varieties and configurations for various applications. Wiring harnesses 104 and 108 are configured to hold different numbers of wires 110 and wires 110 of various gauges. Wiring harnesses 104 and 108 are configured to connect in various manners to external housings (not shown) and wires 110.

Tools 12 are configured to manipulate various wiring harnesses 104 and 108. Tools 12 may manipulate harnesses 104 and 108 individually. Tools 20 and 24 are configured to operate individually or in combination. Tools 26 and 30 are configured to operate individually or in combination. Tools 32 and 36 are configured to operate individually or in combination.

Tools 12 are configured to manipulate various features on wiring harnesses 104 and 108. For example, one of tools 12 is configured to depress a conductive connector to facilitate the connection of wire 110 to wiring harness 104. Alternatively other tools 12 are configured to manipulate the body 112 of wiring harness 112. Other tools 12 may be configured to puncture through portions of wiring harnesses 104 or 108 to facilitate the function of wiring harnesses 104 or 108.

Figure 3:
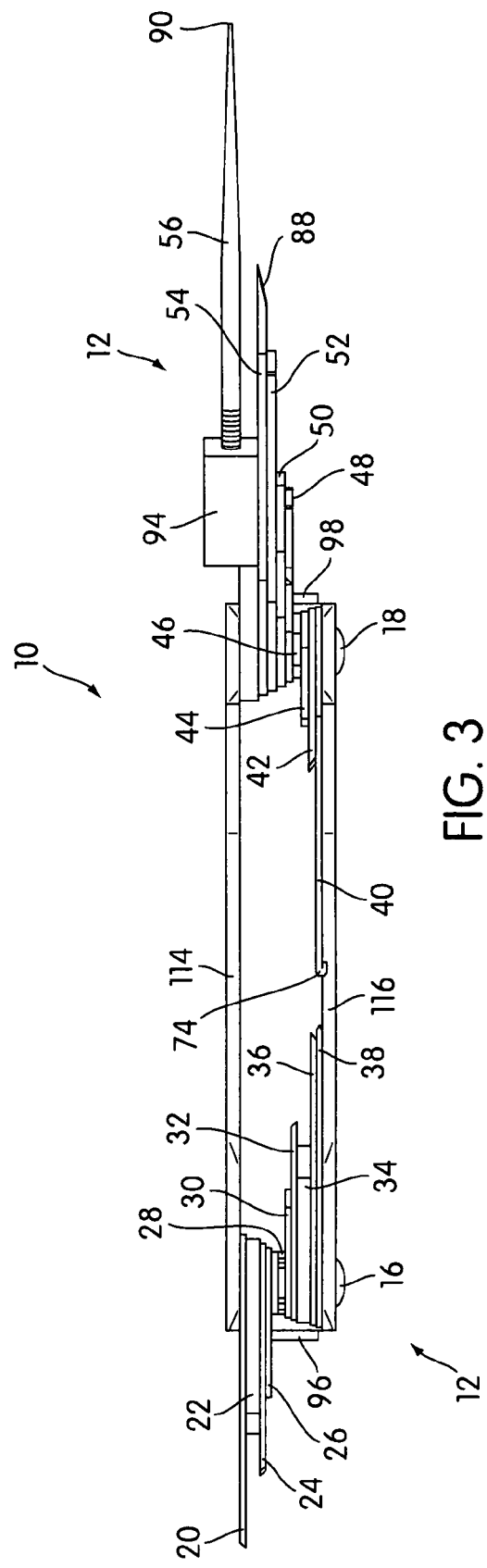
FIG. 3 illustrates a top view of the tooling device.

FIG. 3 illustrates a top view of the tooling device 10. Housing 14 includes side walls 114 and 116. Tools 12 are pivotally mounted on rods 16 and 18 between side walls 114 and 116. As with FIGS. 1 and 2, tools 12 are pivoted at various angles for purposes of illustration. Tool 56, in this exemplary embodiment, is screwed into pivot base 94 with threaded end 92. Tool 56 can be unscrewed from pivot base 94 for replacement or purposes of storage.

Spacers 22 and 34 function to separate tools 20 and 24, and 32 and 36 respectively. Spacers 22 and 34 provide the amount of space needed so that tools 20 and 24, and 32 and 36 can manipulate aspects of wiring harness 104 together in combination. Spacers 22 and 24 may also be pivoted from a stored position to an operative position when either tool pairs 20 and 24, or 32 and 36 are pivoted into the operative position. Tool pairs 20 and 24, and 32 and 36 each form a pair of prongs when both tools in each pair are pivoted into the operative position.

Figure 4:
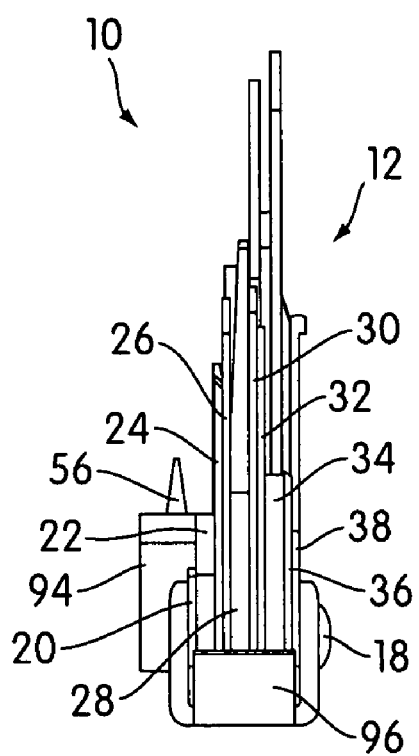
FIGS. 4 and 5 illustrate end views of the tooling device.
Figure 5:
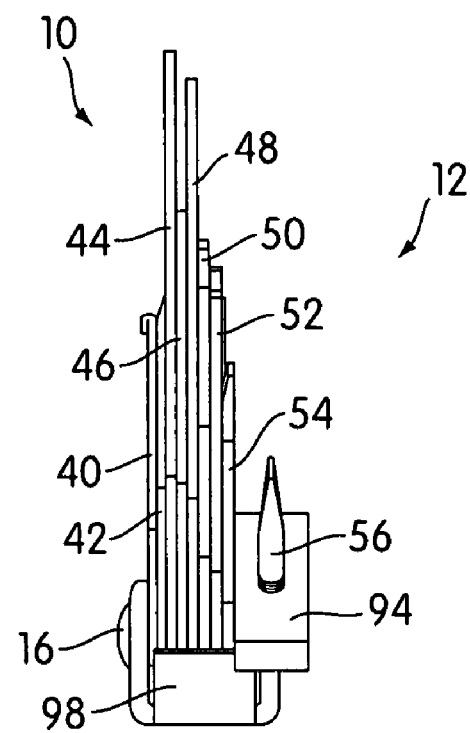

FIGS. 4 and 5 illustrate end views of the tooling device 10. Tools 12 are pivotally mounted to housing 14. Curved portions 96 and 98 provide an ergonomic surface along with housing 14 for facilitating the gripping of tooling device 10 when using it to manipulate wiring harnesses 104 or 108. As with FIGS. 1, 2, and 3, FIGS. 4 and 5 illustrate tools 12 pivoted at various angles for purposes of illustration. Note in FIGS. 4 and 5 how rod 74 is protruding from tool 40.

Figure 6:
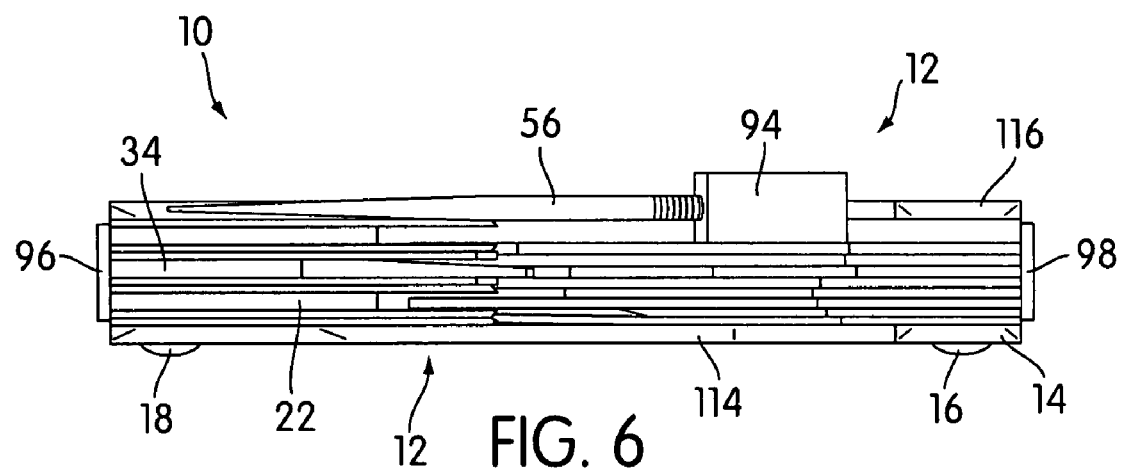
FIG. 6 illustrates a top view of the tooling device having the plurality of tools pivoted into a stored configuration.

FIG. 6 illustrates a top view of the tooling device 10 having the plurality of tools 12 pivoted into a stored configuration. Tools 12 are pivotally mounted on rods 16 and 18 so that they may be pivoted into a stored position. Tooling device 10 is configured to pivot tools 12 into a stored position to protect tools 12 for storage, to reduce the space of tool device 10, and enhance its overall utility. Side walls 114 and 116 generally extend above tools 12 when tools 12 are in a stored configuration. Side walls 114 and 116 are lower in the center portion of tooling device 10 to provide a user with easy access to tools 12, enabling the user to select a tool 12 and pivot it into an operative position.

Figure 7:
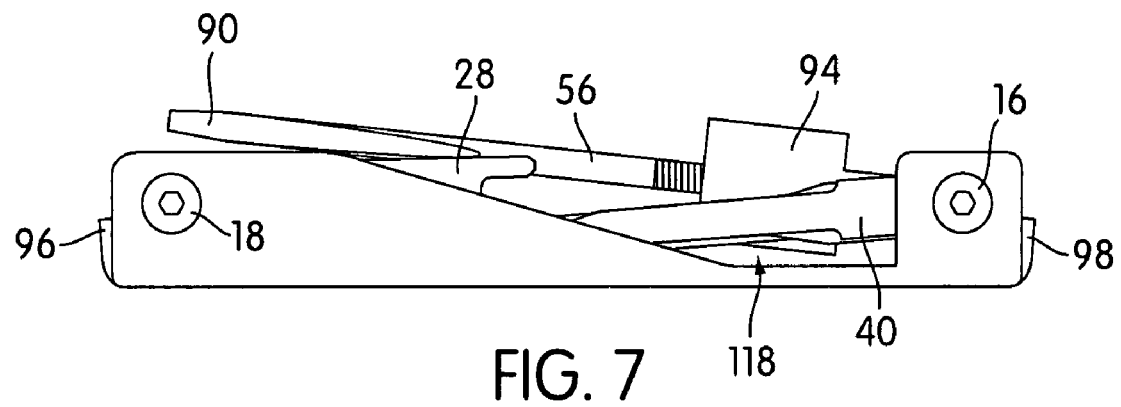
FIG. 7 illustrates a side view of the tooling device having the plurality of tools pivoted into the stored configuration.

FIG. 7 illustrates a side view of the tooling device 10 having the plurality of tools 12 pivoted into the stored configuration. Side walls 114 and 116 are provided with an opening 118 allowing a user to reach in and grip an individual tool 12 and pivot it from the stored position to the operative position. Note that except for tool 56, all other tools pivot to a stored position where the entire tool 12 lies below the height of side walls 114 and 116.

Figure 8:
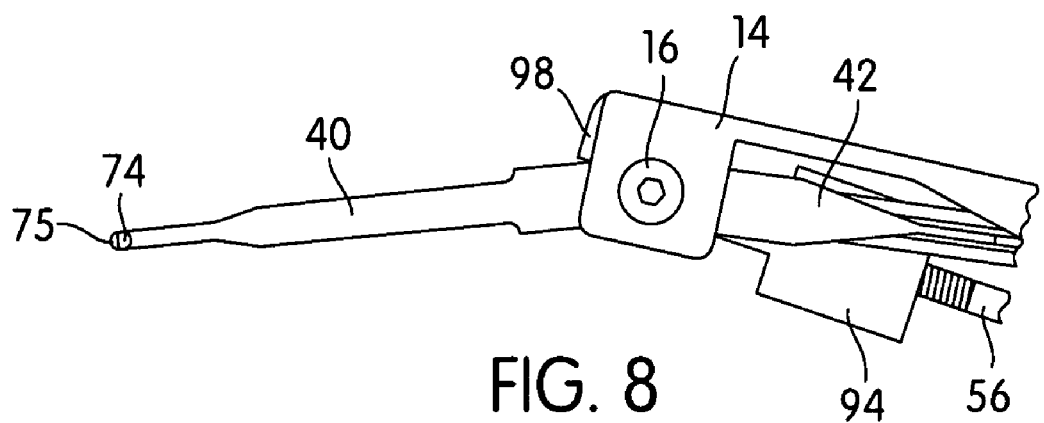
FIG. 8 illustrates a perspective view of the tooling device having a tool extended into an operative position.

FIG. 8 illustrates a perspective view of the tooling device 12 having tool 40 extended into an operative position. Tool 40 is provided with rod 74. Rod 74 extends from the end of tool 40. Rod 74 extends parallel to the axis of rod 16. Rod 74 includes a raised protrusion 75. For use in manipulating a wiring harness 104 or 108, tool 40 is pivoted into the operative position while the remaining tools 12 remain in the stored position. Curved surfaces 96 and 98 function to provide a stop for the pivotal motion of tools 12. As shown in FIG. 8, a user can apply a downward force on housing 14 and tool 40 will remain in operative position resting against curved portion 98. Curved portion 98 stops and further upward pivotal movement of tool 40 when tool 40 is pressed downward against one of wiring harnesses 104 or 108.

FIG. 9 illustrates a perspective view of the tooling device 10 having a pair of tools 20 and 24 extended into an operative position where the pair of tools 20 and 24 are separated by spacer 22. Tools 20 and 24 are pivoted together into the operative position while the remaining tools 12 are in the stored position. Spacer 22 is also shown pivoted into the operative position to support the function of tools 20 and 24. The pivotal movement of tools 20 and 24 and spacer 22 is stopped by curved surface 96. Tools 20 and 24 can be pivoted separately from the stored position to the operative position and used individually to manipulate a wiring harness 104 or 108. Alternatively, tools 20 and 24 can be pivoted together as shown in the operative position along with spacer 22 in order to function together as a single tool to manipulate a wiring harness 104 or 108.

Figure 10:
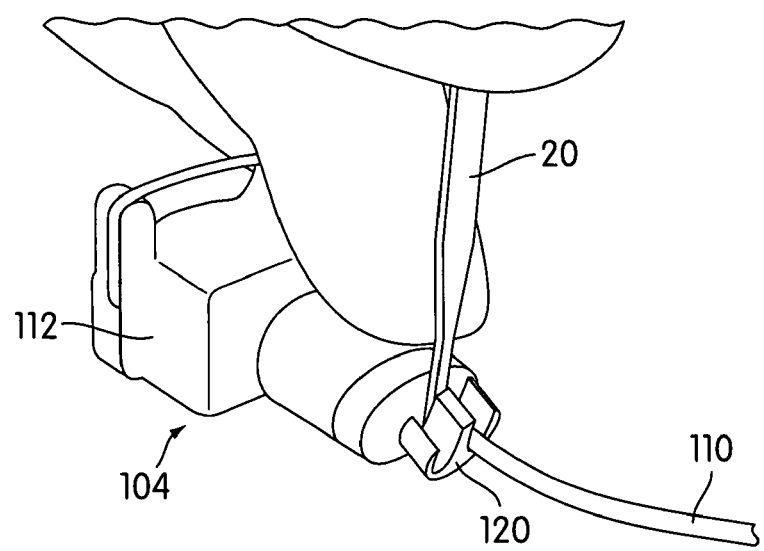
FIG. 10 illustrates a perspective view of a tool manipulating a wiring harness.

FIG. 10 illustrates a perspective view of a tool 20 manipulating a wiring harness 104. Wiring harness 104 includes a body 112. Wiring harness 104 connects to an external wire 110. Wiring harness includes a strain relief 120 for relieving stress on wire 110 to facilitate a more reliable connection between wire 110 and wiring harness 104. Tool 20 is shown extended into the operative position. The beveled end 58 of tool 20 is shown inserted between strain relief 120 and body 112. In this manner, tool 20 is used to separate strain relief 120 from body 112 to facilitate the connection or removal of strain relief 120 from body 112.

Figure 11:
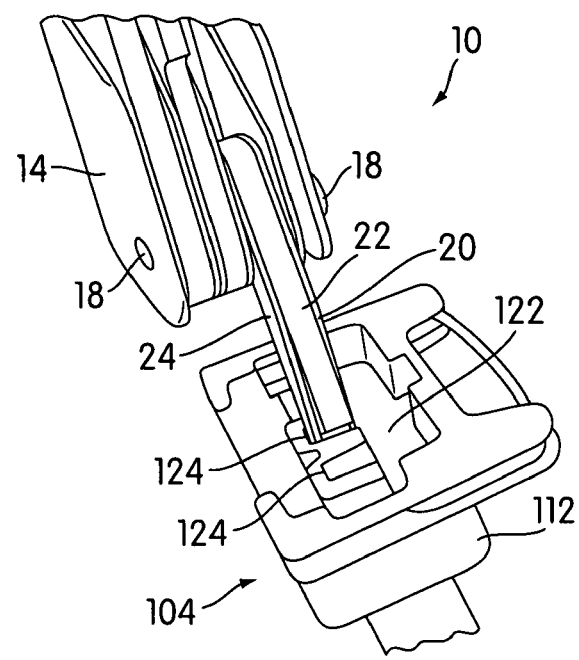
FIG. 11 illustrates a perspective view of a pair of tools separated by a spacer manipulating a wiring harness.

FIG. 11 illustrates a perspective view of a pair of tools 20 and 24 separated by a spacer 22 manipulating a wiring harness 104. A rear portion 122 or wiring harness 104 includes openings 124. Openings 124 are used for the connection of wirings extending from wire 110. Tools 20 and 24 are shown both pivoted into the operative position where they are used in combination as a single tool to manipulate wirings harness 104 in openings 124. Spacer 22 functions to provide mechanical stability and support to tools 20 and 24 as they manipulate wiring harness 104.

Figure 12:
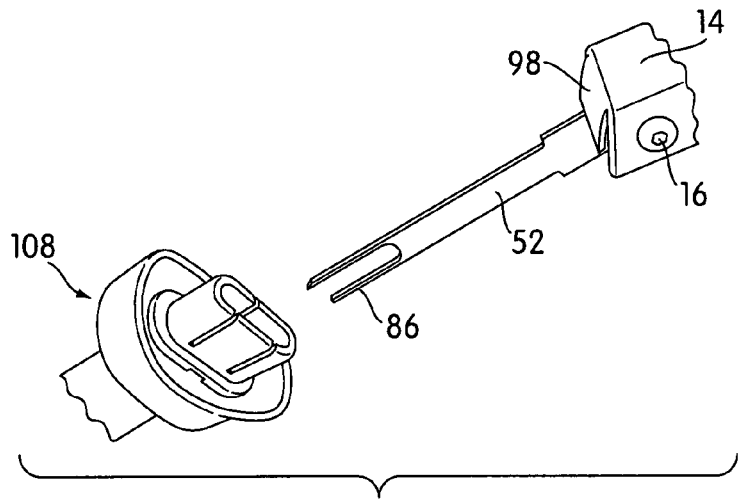
FIG. 12 illustrates a tool having prong ends positioned next to a wiring harness.

FIG. 12 illustrates tool 52 having prong ends 86 positioned next to a wiring harness 108. Prong ends 86 are used to manipulate wiring harness 108. In one embodiment, prong ends 86 are used to puncture holes into wiring harness 108 to facilitate the coupling of wirings to wiring harness 108.

Figure 13:
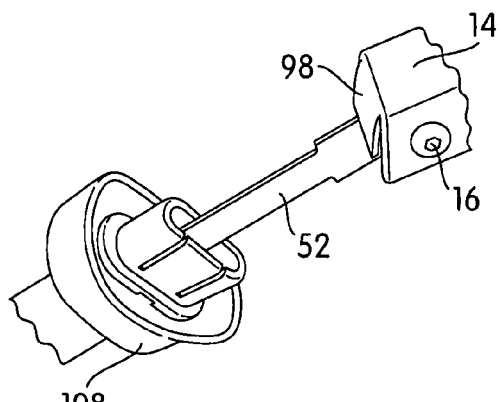
FIG. 13 illustrates the tool having prong ends inserted into the wiring harness.

FIG. 13 illustrates tool 52 having prong ends 86 inserted into the wiring harness 108. In this illustration, tool 52 is inserted such that prong ends 86 extend into the wiring harness 108 having punctured holes into wiring harness 108 for the insertion of wirings to couple to wiring harness 108. Note that curved end 98 prevents further pivotal rotation of tool 52 while it is manipulating wiring harness 108.

Figure 14:
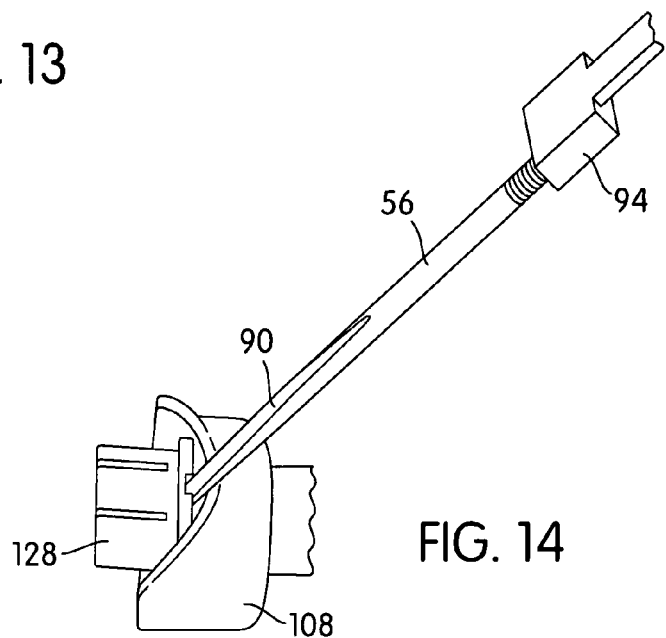
FIG. 14 illustrates a tool having a beveled end engaging a wiring harness.

FIG. 14 illustrates tool 56 having a beveled end 90 engaging a wiring harness 108. Tool 56 is shown extended into the operative position. Tool 56 is shown using its beveled end to manipulate a cap 126 attached to wiring harness 108.

While the invention has been shown and described with reference to a particular embodiment thereof, it will be understood to those skilled in the art, that various changes in form and details may be made therein without departing from the spirit and scope of the invention.

What is claimed is:

1. A tooling device for a wiring harness, comprising:
    a housing;
    a first tool pivotally mounted on a first axis to the housing, the first tool having an end for engaging the wiring harness;
    a second tool pivotally mounted on the first axis to the housing, the second tool having an end for engaging the wiring harness, the first and second tools having an identical length, the ends of the first and second tools having an identical shape with a beveled end portion on one side such that the beveled end portion increases in dimension as it extends from a tip thereof towards the first axis, the ends of the first and second tools having an unbeveled end portion on another side; and
    a spacer having a length shorter than the first and second tools and having a thickness greater than either the first or second tool being positioned between the first and second tools, wherein the spacer pivots about the first axis and pivots separately from the first and second tools, the first and second tools pivot independently of each other, wherein the first and second tools can be pivoted into a operative position independently of each other, wherein the first and second tools can be pivoted into the operative position together, thus enabling the first tool and second tool to be used independently as two separate wiring harness tools or jointly with the spacer as a single wiring harness tool, and wherein the unbeveled end portions of the first and second tools face one another when used together.

2. The tooling device of claim 1, further comprising:
    a third tool pivotally mounted on the first axis to the housing, the third tool having an end for engaging the wiring harness;
    a fourth tool pivotally mounted on the first axis to the housing, the fourth tool having an end for engaging the wiring harness, the third and fourth tools having an identical length, the ends of the third and fourth tools having an identical shape; and
    a second spacer positioned between the third and fourth tools, the third and fourth tools pivot independently of each other, wherein the third and fourth tools can be pivoted into a operative position independently of each other, wherein the third and fourth tools can be pivoted into the operative position together, wherein the third and fourth tools are longer than the first and second tools.

3. The tooling device of claim 2, wherein the second spacer pivots about the first axis.

4. The tooling device of claim 2, further comprising a fifth tool pivotally mounted to the housing, the fifth tool having a closed hook at an end of the fifth tool.

5. The tooling device of claim 1, further comprising a plurality of tools pivotally mounted on a second axis to the housing.

6. The tooling device of claim 1, further comprising a flat tool having a flat body and a pair of planar prongs, the planar prongs extend from an end of the flat tool, the planar prongs are positioned parallel to each other.

7. The tooling device of claim 1, wherein the first and second tools are positioned in an inverted direction relative to each other.

8. A tooling device configured to manipulate an electrical connector, comprising:
    a body;
    a first tool and a second tool pivotally mounted on a first axis to the body, each of the first and second tools being spaced apart at a distance greater than the thickness of each of the first and second tools, each of the first and second tools pivoting independent of each other and having an identical length and shape with a beveled end portion on one side such that the beveled end portion increases in dimension as it extends from a tip thereof towards the first axis, the ends of the first and second tools having an unbeveled end portion on another side; and a spacer pivotally mounted on the first axis and having a thickness greater than either the first or second tool and a length shorter than the first and second tools separating the first and second tools and pivoting separately from the first and second tools, wherein the first tool and the second tool being configured to be used independently as two separate wiring harness tools or jointly with the spacer as a single wiring harness tool, the unbeveled end portions of the first and second tools facing one another when used together.

9. The tooling device of claim 8, further comprising a third tool and a fourth tool pivotally mounted to the body, each of the third and fourth tools being spaced apart, each of the third and fourth tools pivoting independent of each other and having an identical configuration.

10. The tooling device of claim 8, wherein the first and second tools having angled ends.

11. The tooling device of claim 8, further comprising a tool pivotally mounted to the body between the first and second tools.

12. A tooling device for manipulating a wiring harness, comprising:
   a pair of identically shaped tools pivotally attached on a first axis, each tool of the pair of tools having a beveled end portion on one side such that the beveled end portion increases in dimension as it extends from a tip thereof towards the first axis, the beveled end portions of the pair of tools facing in opposing directions, each of the tool of the pair of tools having an unbeveled end portion on another side;
   a spacer having a length shorter than the first and second tools and separating the pair of identically shaped tools at a distance greater than the thickness of each of the identically shaped tools, the spacer pivotally mounted on the first axis and having a thickness greater than either the first or second tool and pivoting separately from the first and second tools; and
   a housing coupled to the spacer, the pair of identically shaped tools being configured to operate as two separate wiring harness tools or jointly with the spacer as a single wiring harness tool, the unbeveled end portions of the pair of identically shaped tools facing one another when used jointly as a single wiring harness tool.

13. The tooling device of claim 12, further comprising:
   a tool pivotally mounted about a second axis to the housing, the tool having a closed hook.

14. The tooling device of claim 12, wherein the identically shaped tools having angled ends.

15. A tooling device configured to manipulate an electrical connector, comprising:
   a body;
   a first plurality of tools pivotally mounted to the body along a first axis;
   a second plurality of tools pivotally mounted to the body along a second axis, the first axis being positioned parallel to and spaced apart from the second axis, the first plurality of tools comprising:
   a first tool and a second tool, each of the tools being spaced apart by a spacer having a length shorter than the first and second tools and a thickness greater than either of the first and second tools, each of the tools pivoting independent of each other and having an identical configuration with a beveled end portion on one side such that the beveled end portion increases in dimension as it extends from a tip thereof towards the first axis, each of the tools having an unbeveled end portion on another side, said first tool and said second tool being placed in an inverted position relative to each other such that the unbeveled sides face one another, the spacer pivotally mounted on the first axis and pivoting separately from the first and second tools, the first and second tools being configured to operate as two separate wiring harness tools or jointly with the spacer as a single wiring harness tool, the second plurality of tools, comprising:
   a flat tool having a flat body and a pair of planar prongs, the planar prongs extending from an end of the flat tool, the planar prongs are positioned parallel to each other; and
   a tool having a hook.

16. The tooling device of claim 15, further comprising a third tool and a fourth tool pivotally mounted to the body, each of the third and fourth tools being spaced apart, each of the third and fourth tools pivoting independent of each other and having an identical configuration, the third and fourth tools being placed in an inverted position relative to each other, the third and fourth tools being longer than the first and second tools.

17. A tooling device configured to manipulate an electrical connector, comprising:
   a body;
   a first tool and a second tool pivotally mounted to the body along a first axis, each of the first and second tools being spaced apart, each of the first and second tools pivoting independent of each other and having an identical configuration with a beveled end portion on one side such that the beveled end portion increases in dimension as it extends from a tip thereof towards the first axis, each of the first and second tools having an unbeveled end portion on another side, the first and second tools being placed in an inverted position relative to each other such that the unbeveled end portions face one another;
   a spacer having a length shorter than the first and second tools and a thickness greater than either the first or second tool separating the first and second tools at a distance greater than the thickness of each of the first and second tools, the spacer pivotally mounted on the first axis and pivoting separately from the first and second tools, the first and second tools being configured to operate as two separate wiring harness tools or jointly with the spacer as a single wiring harness tool;
   a third tool and a fourth tool pivotally mounted to the body along the first axis, each of the third and fourth tools being spaced apart, each of the third and fourth tools pivoting independent of each other and having an identical configuration, the third and fourth tools being longer than the first and second tools;
   a flat tool having a flat body and a pair of planar prongs pivotally mounted to the body along a second axis, the planar prongs extending from an end of the flat tool, the planar prongs being positioned parallel to each other; and
   a tool pivotally mounted to the body along the second axis, the tool having a hook rod extending parallel to the second axis, the second axis being parallel to the first axis.

18. The tooling device of claim 17, wherein the third and fourth tools being placed in an inverted position relative to each other.

* * * * *